United States Patent [19]

Friesen et al.

[11] Patent Number: 4,953,206
[45] Date of Patent: Aug. 28, 1990

[54] METHODS OF AND APPARATUS FOR PROVIDING SUBSTANTIALLY ERROR-FREE TRANSMITTED DATA

[75] Inventors: Harold W. Friesen, Dunwoody; Janice B. Haber, Roswell; Wendell G. Nutt, Dunwoody, all of Ga.

[73] Assignee: AT&T Bell Laboratories, Murray Hill, N.J.

[21] Appl. No.: 307,144

[22] Filed: Feb. 3, 1989

Related U.S. Application Data

[63] Continuation-in-part of Ser. No. 931,330, Nov. 17, 1986, abandoned.

[51] Int. Cl.$^5$ .............................................. H04B 3/32
[52] U.S. Cl. .................................... 379/417; 379/399; 379/414
[58] Field of Search ........................ 379/93, 94, 97, 98, 379/53, 54, 414, 415, 416, 417, 399; 333/12; 370/6

[56] References Cited

U.S. PATENT DOCUMENTS

| | | | |
|---|---|---|---|
| 1,277,025 | 8/1918 | Anderegg et al. | 379/417 X |
| 2,212,927 | 8/1940 | Baguley | 379/417 X |
| 2,260,296 | 10/1941 | Christopher et al. | |
| 3,309,633 | 3/1967 | Mayer | 333/12 X |
| 3,340,364 | 9/1967 | Brightman et al. | 370/6 |
| 3,535,646 | 10/1970 | Quinn | 333/12 |
| 3,641,357 | 2/1972 | Gratzmuller | |
| 3,736,437 | 5/1973 | Nabae et al. | |
| 4,178,480 | 12/1979 | Carbrey | 379/93 X |
| 4,456,985 | 6/1984 | Carsten et al. | 379/399 X |
| 4,456,986 | 6/1984 | Carsten et al. | 370/30 |
| 4,546,212 | 10/1985 | Crowder, Sr. | 379/93 X |
| 4,608,686 | 8/1986 | Barsellotti | 379/94 |
| 4,640,989 | 2/1987 | Riner et al. | 379/94 |

FOREIGN PATENT DOCUMENTS 751758 4/1953 Fed. Rep. of Germany .
248465 8/1987 German Democratic Rep. .

OTHER PUBLICATIONS

"Synthesis of Paralleled Three-Terminal R-C, Networks to Provide Complex Zeros in the Transfer Function", P. F. Ordung et al., AIEE Technical Paper, Nov. 1, 1951.
Inmac Catalog, 51st Ed., Apr. 1986, pp. 117, 118, 124, 153, 139.
"Making the Data Connection with Twisted-Pair Cable", Ross, Telecommunications, Sep. 1986, pp. 154, 156, 158 and 160.
"Passive and Active Network Analysis and Sythesis", Budak Houghton Mifflin 6, Boston 1974 pp. 533–545.
Spectrum Catalog (Apr., 1984).
R. Komiya, et al., The Loop Coverage Comparison Between TCM and Echo Canceller Under Various Noise Considerations, IEEE Transactions on Communications, vol. Com-34, Nov. 1986, No. 11.
Telcom Report, vol. 5, No. 1, Feb. 1982, pp. 8–13.

*Primary Examiner*—Jin F. Ng
*Assistant Examiner*—Randall S. Vaas
*Attorney, Agent, or Firm*—Edward W. Somers

[57] ABSTRACT

In a system (20) for transmitting voice and data signals, insulated metallic conductor pairs (44—44) which transmit data signals and insulated metallic conductor pairs (46—46) which are capable of transmitting voice signals are enclosed in a common sheath system of a single cable (40). User pickup of station apparatus (34) during the generation of a ringing voltage on a voice conductor pair causes that pair to become disturbing and to impart impulse noise to a closely coupled data pair. The data pair is designated a disturbed pair and the signals transmitted thereby may be affected adversely. This problem is overcome by providing a circuit (80) comprising in parallel a resistance and an inductance and being in series with the station apparatus. Such an arrangement reduces substantially that frequency content of any disturbing signal which appears on the disturbing pair and which is in the range of the data signal spectrum. This reduces the magnitude of crosstalk between the voice and data pairs and results in substantially error-free transmitted data.

14 Claims, 5 Drawing Sheets

CROSSTALK PULSE LARGE ENOUGH TO CAUSE TRANSMITTED T1 LEVEL OF +"1" TO BE INTERPRETED AS "0"

FIG 5A

CROSSTALK PULSE SMALL ENOUGH (DUE TO FILTERING) TO ALLOW TRANSMITTED T1 LEVEL OF +"1" TO BE CORRECTLY INTERPRETED AS +"1"

METHODS OF AND APPARATUS FOR PROVIDING SUBSTANTIALLY ERROR-FREE TRANSMITTED DATA

This application is a continuation-in-part of application Ser. No. 06/931,330, filed on 11/17/86 now abandoned.

TECHNICAL FIELD

This invention relates to methods of and a system for providing voice and substantially error-free transmitted data signals in a single cable. More particularly, it relates to methods and a system for transmitting voice and substantially error-free T1 data signals in a single cable.

BACKGROUND OF THE INVENTION

For some time, studies have emphasized the importance of considering the effects of impulse noise coupled by crosstalk between cable pairs, especially near end crosstalk (NEXT), as a predominant source of error in digital transmission systems. Near end crosstalk is that crosstalk which occurs at the same end of a multi-pair cable as a disturbance. See Cravis, H. and Crater, T. V, "Engineering of T1 Carrier System Repeater Lines". B.S.T.J. 42, No. 1, March 1963, pp. 431–86.

This is particularly true in a system which is referred to as a T1 system in which voice and data conductor pairs are provided in a single cable and enclosed in a common sheath system. In a T1 system, whereas a single pair of electrical conductors may be used for voice transmission, it is common to use two pairs for data, one for receiving data signals from a remote terminal and one for transmitting data signals to the remote terminal.

A T1 system is one which uses a 1.5 megabit per second signal and, more particularly, a 1.5 megabit alternate mark inversion (AMI) signal. AMI is a coding scheme whereby successive consecutive pulses must be of opposite polarity. In such a system, a "0" is transmitted with the absence of a mark. A mark is transmitted as a "1" or high voltage pulse having a magnitude of 3 volts and either a positive or negative polarity. However, the next successive mark would have the opposite polarity. A bipolar violation occurs when two consecutive high voltage pulses of the same polarity are transmitted. Generally, this condition is recognied by T1 receiving apparatus.

Impulse noise can have an adverse effect on the transmission of data signals in a T1 system. Relays, switches, rectifier power supplies, AC power wiring, test tones and ringing generators in central offices and remote terminals all have been identified as impulse noise sources. Impulses, though occurring spasmodically, typically are 20 to 40 dB stronger than any desired signal being transmitted and include many high frequency components. As a result, impulses are difficult to eliminate.

Cravis and Crater, op cit, recognized crosstalk interference from impulse noise as a problem for T1 transmission. Their solutions are twofold. First, they reduced the distance (spacing) between regenerations whenever close to sources of impulse noise. Typically, the reduction was 50%. This meant that the received signal, instead of being attenuated 30 to 35 dB, was attenuated only about 15 dB. The reduced spacing results in 15 to 20 dB stronger received signals, which are more resistant to interference. Second, they used some pair groups entirely for T1 and other pair groups entirely for voice. Keeping T1 and voice in separate pair groups reduces the impulse crosstalk interference. However, there is considerable evidence that most errors in T1 systems emanate from central offices.

These solutions, though far from perfect, are still used. They are not onerous for T1 usage as a trunk facility connecting central offices, nor are they onerous for T1 usage for loop carrier systems because, typically, trunk cables and loop-carrier cables extend several miles and include several repeater sections. Therefore, short sections near one or both ends are simple, expedient and not too expensive. Since the cables emanating from central offices usually have hundreds of pairs, dedicating certain pair groups is not inefficient. In the case of loop carrier, the T1 transmission ends at a remote terminal, usually still in a fair size cable so that using a pair group strictly for T1 is feasible. Subscriber stations are hundreds or thousands of feet away.

Today T1 carrier service is being delivered to subscribers. For example, in 1985 upwards of about 2000 such T1 communications lines were installed and it has been found that troublesome inpulse noise can be generated by certain telephone set operations.

When the ringing signal in a voice pair of conductors is interrupted, the disturbance can be at least 20 dB stronger than intersystem near end crosstalk. While such strong impulses are infrequent, they may be of concern, particularly as T1 service to customer premises continues to grow. Shortening of the end sections was tolerable when most systems extended several miles between central offices. Today T1 signals are being delivered to individual subscribers, over 50% of which are located less than 2.5 miles from central offices.

Station-generated noise on a voice conductor pair can cause errors in T1 data signals transmitted on another conductor pair enclosed in the same cable sheath system. In a typical optical communication distribution system, cables which include hundreds or thousands of pairs are routed from a central point, are branched into smaller cables, and as they near the subscribers, may have 25 pairs, for example. Within a premises, the cables may include four or only two pairs of conductors. In this situation, the voice pair is designated as the disturbing pair and the data pair, the disturbed pair. It has been found that the ringing of station apparatus can coexist with substantially error-free data transmission in a T1 system; however, upon pickup at the station apparatus, an undesirable voltage step is created which may adversely affect the data signal that has been transmitted. The station apparatus may be any which is capable of generating an abrupt, transient voltage. Voltage on one conductor pair shows up on another pair because of uncompensated mutual capacitance and inductance between pairs. Although cables typically are designed so as to have very little net coupling between conductor pairs, small residual capacitance and inductance unbalances remain and provide the mechanism for crosstalk coupling between the pairs.

When conductor pairs are coupled, the mechanism is in place for imparting a voltage impulse created on one pair when, for example, a telephone set on another line in the same cable goes off-hook. It is assumed that the telephone line is of the 48 volt common battery type and therefore would have a 48 volt DC charge. When the receiver of the telephone set is lifted from the switchhook, the connected cable pair is discharged suddenly, creating a voltage step. This sudden change in voltage is coupled through the mechanism of crosstalk to a closely coupled data conductor pair as impulse noise. If the receiver is lifted while the telephone set is being rung, the step voltage can be more than three times the normal line voltage. Another impulse generator is a rotary dial which repeatedly shorts the pair.

Various schemes have been available for dealing with the noise problem in analog systems. For example, diode limiters cause any disturbances on a line above a certain magnitude to be cut off. This problem also may be avoided by assigning voice and data to conductor pairs which are not closely coupled. However, this last-mentioned technique for avoiding impulse noise, which is called pair selection, is subject to human error, is of limited effect in cables having only a few pairs and is not commonly used.

Also well known are various schemes for separating the usable bandwidth of a single cable pair into separate channels. One method of doing this would include the step of dividing the usable bandwidth into frequency bands. Each band then could be used to transmit its own signal which could be analog or digital. Interference between the signals being transmitted in different frequency bands is properly termed crosstalk and, in such cases, is crosstalk between channels on the same pair.

The prior art also includes devices for dealing with impulse noise generators. As far as is known, devices for resisting the effect of impulse noise generators commonly are included in the circuit which is the target of the disturbance and which is referred to as the disturbed circuit. This may not always be a practical arrangement.

What is needed and what is not provided in the prior art are methods and a system for providing voice on one pair and substantially error-free transmitted T1 data signals on another pair, both pairs being disposed within the same cable. Desirably, apparatus for providing such error-free transmission is simplistic in design and can be included readily in existing systems and hopefully in the disturbing, rather than in the disturbed circuit.

SUMMARY OF THE INVENTION

The foregoing problem of impulse noise disturbances on the transmission of data has been overcome by the methods and system of this invention. A method of providing voice signals on some pairs and transmit on other pairs for extended distances data signals which are substantially error-free in a single cable includes the steps of transmitting data signals on at least one pair of insulated metallic conductors while transmitting voice signals on at least one pair of insulated metallic conductors which may be closely coupled to the pair on which the data signals are transmitted. That frequency content of any disturbance which appears on the pair of conductors for transmitting voice and which is in the range of the data signal spectrum is reduced substantially to reduce the magnitude of crosstalk between the voice and the data pairs. This may be accomplished by using a filter circuit adjacent to station apparatus for the voice circuit which effectively removes part of the spectrum of a disturbing electrical signal.

A system for providing transmitted data signals which are substantially error free and voice signals includes a single cable which includes pairs of insulated metallic conductors that are adapted to transmit voice signals and pairs of insulated metallic conductors which are adapted to transmit data signals and station apparatus which is connected to each pair of insulated metallic conductors that are transmitting voice signals. Each pair of insulated metallic conductors which transmit voice signals has the capability of becoming a disturbing pair when there is a switching of station functions, such as when the handset is removed from the switchhook connecting the talk circuits to the line. The disturbance may be especially severe when there is an interruption of the ringing generated voltage on the voice pair. Each pair of insulated metallic conductors used to transmit data is regarded as a disturbed pair inasmuch as each such pair may be affected adversely by impulse noise resulting from an interruption of the signal on the voice pair such as a receiver pickup during ringing. The system includes facilities for reducing that frequency content of any disturbing signal which appears on a pair of conductors for transmitting voice and which is in the range of the data signal spectrum to reduce the magnitude of crosstalk between the voice and data pairs. In a preferred embodiment, a filter circuit is positioned in series with a conventional telephone set. The filter circuit may be included as part of station apparatus which is connected by a telephone cord to a wall terminal and thence to an incoming line.

BRIEF DESCRIPTION OF THE DRAWINGS

Other features of the invention will be more readily understood from the following detailed description when read in conjunction with the accompanying drawings in which.

DETAILED DESCRIPTION

Figure 1:
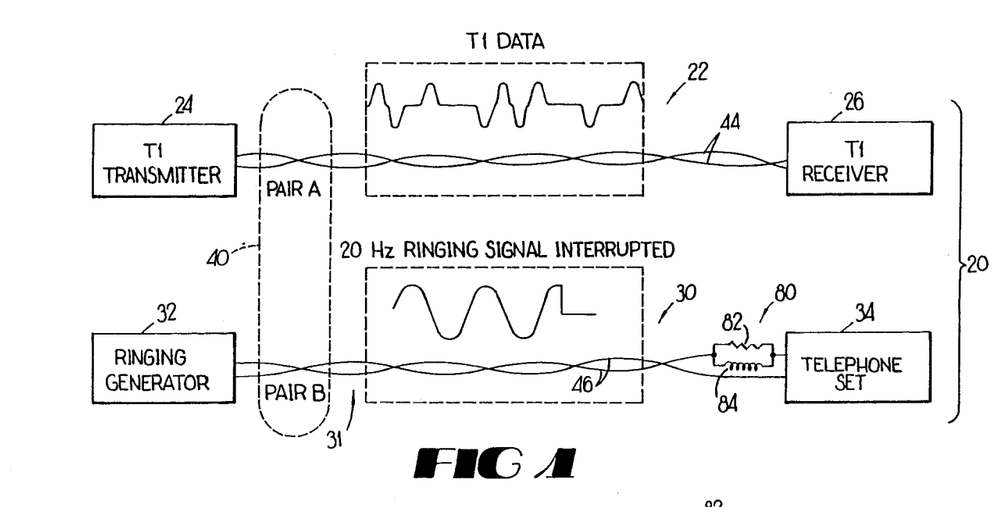
FIG. 1 is a schematic view of a T1 communications system in which voice and data signals are transmitted by metallic conductor pairs enclosed together in a common sheath system of a single cable with filter provisions for preventing impulse noise disturbances.
Figure 2:
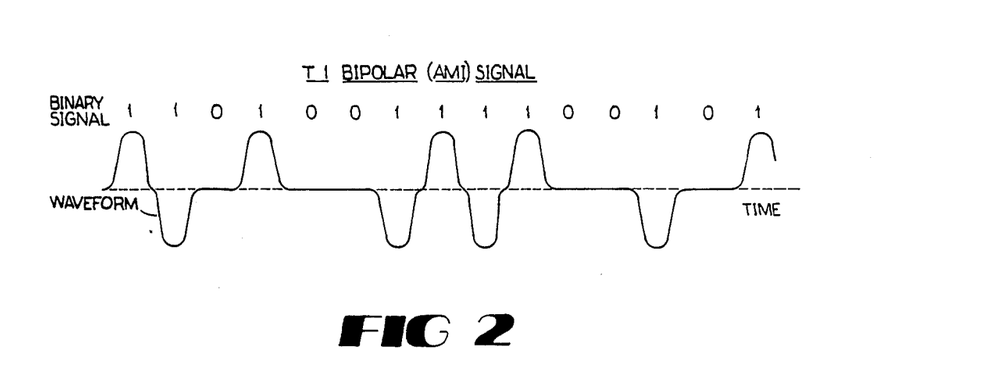
FIG. 2 is a schematic view of the transmission of a T1 bipolar signal.

Referring now to FIG. 1, there is shown a system, which is designated generally by the numeral 20, for transmitting voice and data signals. More particularly, the system 20 is referred to as a T1 system in which the voice and data signals which are transmitted are 1.5 megabit per second signals. As can be seen in FIG. 2, T1 transmission involves a bipolar (AMI) signal in which successive signals are of opposite polarity. A mark is transmitted as a "1" or high voltage pulse and a "0" is transmitted with the absence of a mark.

The system 20 includes a data circuit 22 which includes facilities 24 for generating data signals and facilities such as a computer 26 for receiving those data signals. The system 20 also includes voice transmission facilities comprising at least one voice circuit 31. The voice circuit 31 includes means 32 such as a ringing generator in a central office, for example, for generating a ringing signal and facilities 34 for transmitting and receiving voice signals. The facilities 34 may be a conventional station apparatus such as a well known customer premise telephone set.

Also, the system 20 includes facilities for connecting each of a plurality of transmitting and receiving means for the voice signals to the ringing generator 32 and facilities for connecting the transmitting and receiving facilities for the data signals. These facilities include a cable 40 comprising a plurality of insulated metallic conductors. The cable 40 includes at least one pair of insulated metallic conductors 44-44 for transmitting data signals and at least one pair of insulated metallic conductors 46-46 for transmitting voice signals. Of course, as mentioned earlier, it is common in a T1 system to associate two data pairs with each terminal, one for each direction of transmission. Each insulated metallic conductor 44 and 46 includes a metallic conductor such as copper, for example, and an insulation cover comprising polyethylene or pulp, for example. The cable 40 also includes a sheath system (not shown) typically comprising a plastic jacket or a metallic shield and a plastic jacket which is common to and which encloses the voice pairs and the data pairs.

Station-generated noise on the voice pair 46, such as that generated by a common telephone set or PBX, can cause errors in T1 data transmitted on the data pair 44. Accordingly, the voice pair 46 is referred to as a disturbing pair whereas the data pair 44 is referred to as the disturbed pair. The station-generated impulse noise coupled by near end crosstalk is a predominant source of digital transmission error in T1 systems. See R. Komiya, K. Yoshida and N. Tamaki, "The Loop Coverage Comparison Between TCM and Echo Canceller Under Various Noise Considerations" IEEE Transactions on Communications Vol. COM-34, No. 11, November 1986, p. 1058. Impulse noise which has such an effect is generated as a result of pick up of the station apparatus during the generation of a ringing voltage. If the voice and data conductor pairs are coupled closely, this interruption causes a voltage step in the disturbing pair which may result in errors in the transmitted data signals.

It should be apparent that there is special concern with respect to impulse noise at that end of a transmission line which is near the telephone set where the transmitted data signals are weakest. Also, it should be remembered that it is desirable to be able to transmit as far as possible and to be able to recover, error free, weakened signals. The other data pair at the telephone set end of the cable is carrying a newly generated strong signal at that end and far end crosstalk (FEXT) in the voice line usually is not strong enough to cause errors in the return data pair.

Figure 3A:
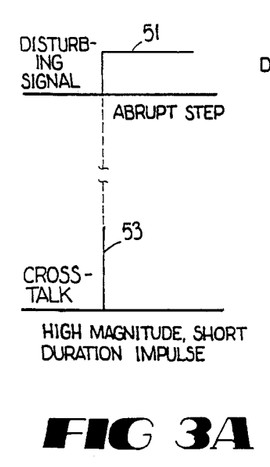
FIGS. 3A, 3B, and 3C are schematic views of disturbing signals on voice pairs of a cable and resultant crosstalk on a data pair.
Figure 3B:
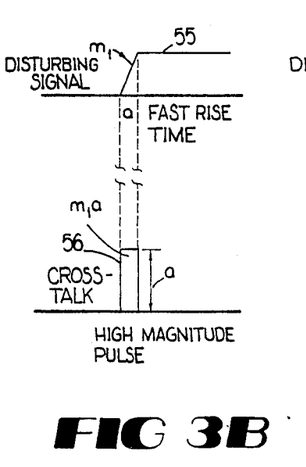
Figure 3C:
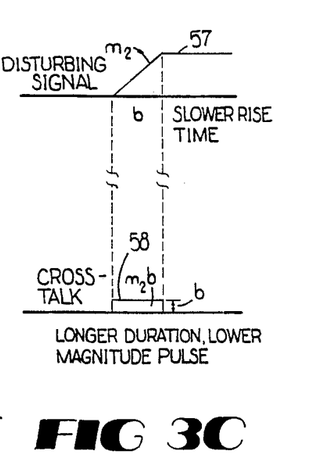

Referring now to FIG. 3, there are shown a sequence of waveforms which show disturbances and resultant crosstalk. The coupling between conductor pairs is simplified such that it is concentrated at a given point. It should be remembered that the pair coupling does not occur only at one point, but rather throughout the cable, which could compound the adverse effect on the transmitted data. The crosstalk appears as a differentiator of the disturbing signal. If the disturbing waveform comprises an abrupt step 51 with a relatively short rise time and the coupling is concentrated at some point in the cable, then the crosstalk will be an impulse of voltage with a magnitude proportional to the magnitude of the step (see FIG. 3A). As is seen, this is a high magnitude, short duration pulse 53 which if occurring at a point of close coupling between voice and data pairs can result in an error.

Other possibilities are shown in FIGS. 3B and 3C. If the disturbing waveform has a longer rise time and hence a more ramp-like appearance, such as a waveform designated 55, the crosstalk will comprise a pulse 56 with a duration "a" equal to the rise time of the ramp and a magnitude proportional to the slope "$m_1$", of the ramp (FIG. 3B). Disturbing waveforms with even longer rise times, hence smaller slopes, will cause crosstalk pulses of longer duration and smaller magnitudes. For example, as shown in FIG. 3C, the rise time of a disturbing waveform 57 is designated "b" which is greater than the rise time "a" in FIG. 3B and the slope of the disturbing waveform is "$m_2$" which is less than "$m_1$". Hence, the magnitude of the crosstalk pulse 58 is less even though the area of the crosstalk pulse in FIG. 3C is equal to that in FIG. 3B. The height of the crosstalk pulse is proportional to the slope of the disturbing waveform and if it is lower, it will not be as great a disturbance as if it were higher. The step results in an impulse on the disturbed data pair with the derivative of the disturbing signal being the crosstalk pulse. Also, the high frequency content of the disturber defines its rise time. The higher the frequency content, the shorter the rise time.

Figure 4A:
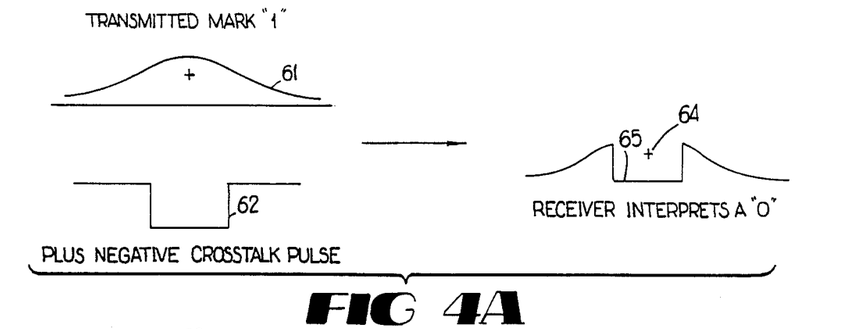
FIGS. 4A and 4B are schematic views which show the effect of a crosstalk pulse on a T1 signal.
Figure 4B:
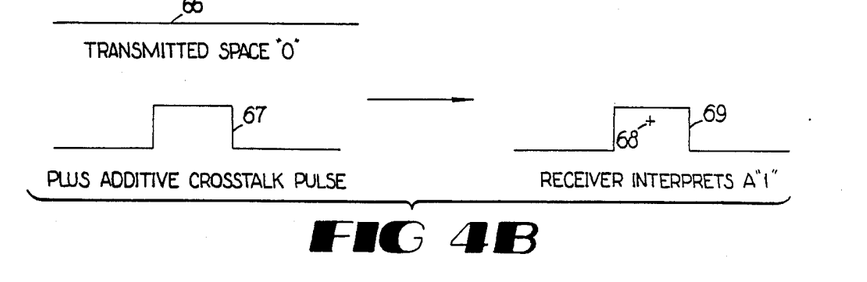

Going now to FIG. 4A, it can be seen that if a mark 61 has been transmitted and if a step 62 of sufficient magnitude and of opposite polarity couples over as a negative going pulse, then at a decision point 64, based on the composite of the transmitted signal and the crosstalk, the receiver 26 decides erroneously that a "0" or space 65 has been transmitted. If on the other hand there is a transmitted space 66 equating to a "0" and a positive going crosstalk pulse 67, it is possible in a closely coupled pair situation that the two at a decision point 68 can add to provide a mark 69 or a "1" signal to the receiver 26 which as before is an erroneous decision (see FIG. 4B).

Figure 5A:
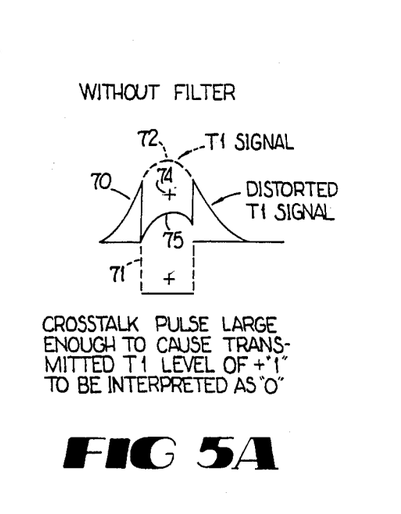
FIGS. 5A and 5B are composite schematic views which show without and with a low pass filter, respectively, the effect of a crosstalk pulse on a T1 signal.
Figure 5B:
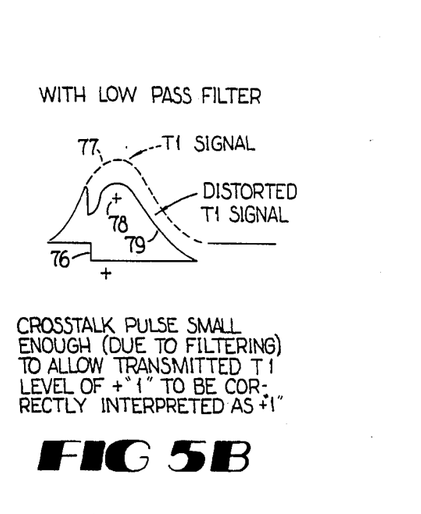

The occurrence of errors also may be discussed with respect to FIG. 5. In FIG. 5A, there is shown a composite 70 of a transmitted data pulse. Depending on its sign and magnitude, a crosstalk pulse 71 present at a decision point 74 can either add to or subtract from the transmitted T1 signal 72 at the so-called decision eye designated 74. If the T1 signal is at a +1 level at the decision point 74 and the crosstalk pulse 71 is relatively large, for example >0.5 relative to the amplitude of a mark, and negative, the regenerator may output a signal 75 as a "0" or a "−1". The point designated 74 is referred to as a decision point with its vertical centerline representing the time of decision and its horizontal centerline representing the magnitude to distinguish a "1" (above) or a "0" (below). If, however, a crosstalk pulse 76 (see FIG. 5B) is smaller, for example <0.5 relative to the amplitude of a mark and of longer duration as a result of filtering, for example, the T1 pulse 77 in that interval will be detected correctly at a decision point 78. In FIG.

5A, the crosstalk pulse is sufficiently large to cause the transmitted T1 level of +1 at decision time to be interpreted as a "0". This is because the crosstalk pulse 71 arrived at an appropriate time to subtract from the positive going pulse 72. Only if timed appropriately is the subtractive crosstalk pulse capable of causing an error. In the example of FIG. 5B, the composite pulse 79 has an amplitude which is above the critical magnitude at the decision time 78. Hence, the crosstalk pulse 76 in that instance does not cause an error.

An error in the transmitted data signal will occur only if particular conditions are satisfied. First, in order for it to be disturbed to the degree required to result in the receipt of erroneous data at the receiver, the data pair must be coupled closely to the voice pair in which the ringing signal is interrupted by removal of the receiver of a handset, for example. Also, the magnitude of the disturbing pulse must be sufficient and the polarity of the disturbing pulse must be appropriate so that the disturbing pulse can add to or subtract from the transmitted data pulse in such a way as to cause the voltage level at the receiver to be misrepresentative of the data signal which was transmitted. Further, the timing must be such that the disturbing pulse arrives at the receiver at the time the decision must be made. If the magnitude of the impulse noise is too low or if its polarity is such that it tends to reinforce the transmitted data signal, it may not cause an error even if it arrives at the time the receiver must make a decision.

In order to overcome the problem of errors in transmitted data signals, the T1 transmitting system 20 is caused to include facilities for reducing substantially the high frequency content of the disturbing signal. The facilities which are provided function to reduce that frequency content of any disturbing signal which appears on the voice pair 46 and which is in the range of the data signal spectrum. In a preferred embodiment, the system 20 is effective to reduce substantially the frequency content of any disturbing signal which exceeds a value of about 100 kHz. A low-pass filter on the voice pair serves to attenuate high frequency components in the disturbing signal thus increasing the rise time of the disturbing waveform. This, in turn, decreases the magnitude of the crosstalk (see FIGS. 3B and 3C).

The methods and system of this invention cause the high frequency components of the disturbing pulse to be reduced substantially. This causes the magnitude of the crosstalk pulse to be less. If the lower frequency content were reduced, the voice transmission could be inhibited. Accordingly, only that frequency content well beyond voice is reduced substantialy in magnitude.

A relatively simple filter circuit 80 is shown in FIG. 1 for reducing the impact of impulse noise from a voice pair 46 on a data pair 44. The filter circuit is effective to reduce the voltage which is applied to the telephone set at higher frequencies while allowing the applied voltage to be unattenuated throughout the voice band. In a preferred embodiment, the filter arrangement 80 includes a resistance 82 and an inductance 84 in parallel. The parallel resistance 82 and inductance 84 are placed in series with the disturbing voice circuit 31.

In one possible arrangement, the filter circuit 80 is included in customer station apparatus such as the familiar telephone set. As is well known, a telephone set is connected to a wall outlet by a cord which thereby connects the receiver and transmitter to an incoming voice pair. The cord is connected to the telephone set by a modular plug. Modular plugs are shown for example in U.S. Pat. No. 4,148,539 which issued on Apr. 10, 1979 in the name of E. C. Hardesty and which is incorporated by reference hereinto.

An experiment was conducted in order to establish that the filter circuit 80 of FIG. 1 which has been proposed as a solution to the station-generated noise problem is effective in reducing errors in the transmission of T1 data. Twenty-five pairs of a 24-gauge, polyethylene-insulated cable conductors were fanned out onto a circuit board. The two conductor pairs exhibiting the worst crosstalk (NEXT) were singled out for experimental investigation, the philosophy being that any filtering scheme capable of reducing errors for the pairs exhibiting the most extreme crosstalk would very likely reduce or eliminate errors between pairs for which the crosstalk was less severe. The loss of 5700 feet of the cable used in this experiment was 33.2 dB at 772 kHz. This signal attenuation is typical of the spans between regenerators where there are no significant impulses on other pairs. A T1 test set (not shown) comprising a transmitter and receiver the cable, and a T1 regenerative repeater (not shown) were configured into a disturbed circuit. The transmitter was set to output a pseudo-random T1 signal. A standard 20 Hz, 88-volt ringing generator with a 38-bolt biasing power supply was connected by the cable to a conventional customer telephone set. This comprised the disturbing circuit. Ringing from the generator was interrupted by releasing the switchhook of the telephone manually, and errors in transmission of the T1 data sent by the transmitter were recorded by the test set receiver.

Figure 6A:
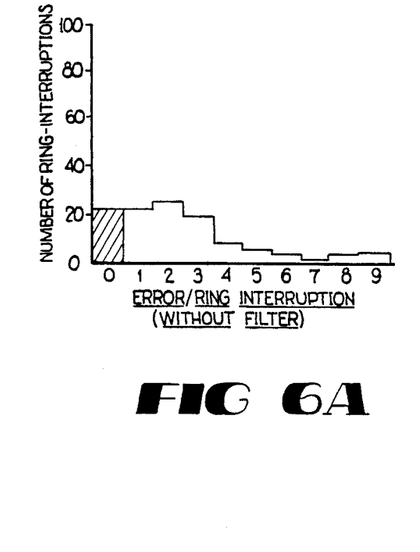
FIGS. 6A and 6B are histograms which show errors per ring interruption with and without a filter, respectively.

Without any filtering scheme employed, errors on the order of two errors per ring-interruption were observed. The errors were rather bursty in nature in that whereas the average was two errors per ring-interruption, the actual occurrence of errors included error-free interrutpions as well as multiple-error interruptions (FIG. 6A). Errors occurred both when the switchhook of the telephone set was depressed and when it was released. For the investigation conducted, only errors produced by the release of the switchhook were of significance inasmuch as ringing is not generally interrupted when the receiver is placed on-hook during normal operation. FIG. 6A, therefore, depicts only errors occurring upon release of the switchhook for the disturbing circuit with no filter. For the experiment, out of 100 interruptions, errors at the data receiving means occurred about 80% of the time.

To continue the experiment, a circuit filter 80 comprising the resistance 82 and the inductance 84 in parallel was placed in series with the telephone set to reduce the voltage applied to the telephone set at higher frequencies while allowing the applied voltage to be unattenuated through the voiceband of 300–4000 Hz. Values of resistance and inductance for the filter were chosen to cause attenuation of the applied voltage for frequencies on the order of 100 kHz and above. In the experiment, the resistance was chosen to have a value less than 2 k$\Omega$ and the inductance to have a value which was greater than about 100 $\mu$H but less than about 1000 $\mu$H.

Figure 6B:
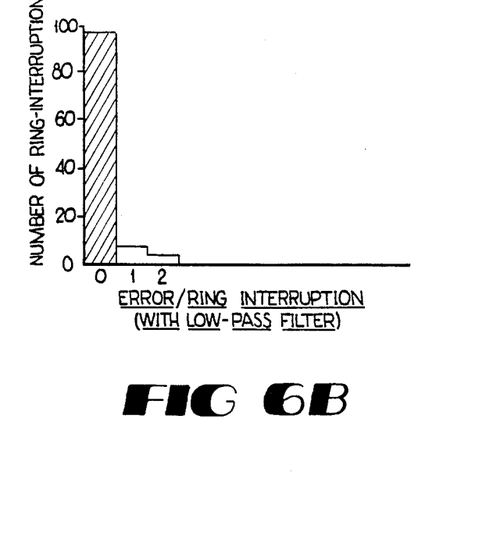

A histogram depicting errors produced upon the release of the switchhook for the filtered circuit is provided in FIG. 6B for filter components R=1 k$\Omega$ and L=330 $\mu$H. It can be seen that the filter acts to reduce not only the number of errors, but the burstiness of the errors as well. That is, the multiplicity of errors on a single interruption is reduced; there no longer exists the relatively high probability of experiencing errors.

Several combinations of resistance and inductance were used in an attempt to optimize the effect of the filter in reducing errors. The ringing generator was applied to the telephone set and interrupted thirty times per minute for each of the filter combinations of resistance and inductance, and the filter significantly reduced the received error rate for all nonzero values of inductance. Values of resistance in the filter ranged between 0 and 2 kΩ. The optimum value of resistance in the filter circuit 80 appeared to be about 1 kΩ. Fewer errors resulted with the 1 kΩ resistor in the circuit 80 than with any other resistance value in that range which was used.

It is, of course, highly desirable that if any hardware is added to the transmission circuit, it will not result in any loss in the voiceband of frequencies in the voice circuit. Calculated and experimental data both indicate that the filter circuit 80 causes essentially no additional loss in the voiceband and 9.4 to 15.5 dB of additional loss at 1 MHz for inductors in the range 100 $\mu$H to 1 mH. The filtered and non-filtered responses are identical in the voiceband.

Figure 7:
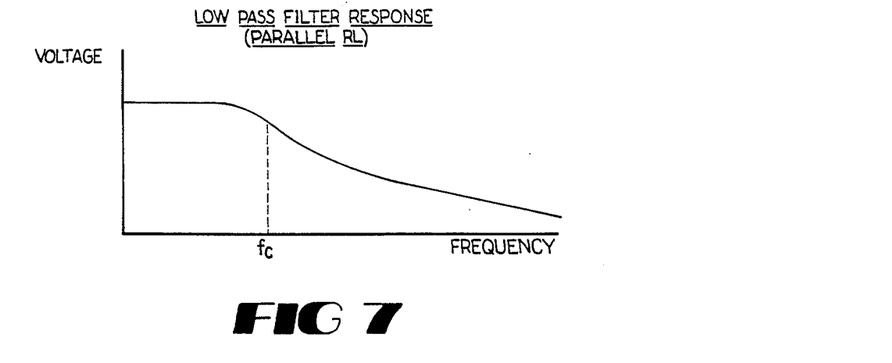
FIG. 7 is a frequency response curve for a low pass filter.
Figure 8:
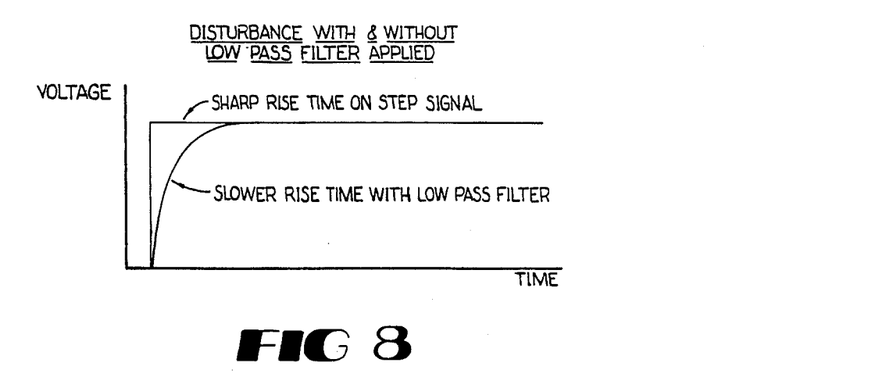
FIG. 8 is a schematic view which shows a disturbance with and without a low pass filter applied.

Going now to FIG. 7, there is shown a frequency response curve of a low pass filter with the resistance 82 and the inductance 84 in parallel. In a generic filter arrangement, the voltage is not attenuated for low frequency disturbance, but beyond the cutoff frequency, $f_c$, there is attenuation. The filter circuit 80 is effective to pass the low frequency content and to filter the high frequency content of the voltage. As a result of applying a low pass filter to a disturbing signal with a short rise time, there is a more gradual rise in the disturbing voltage as depicted by the rounded corner of the curve in FIG. 8. Because the filter increases the voltage rise time, the crosstalk pulse is caused to be smaller in magnitude.

Whereas the filter circuit 80 which is shown in FIG. 1 is the preferred embodiment for reducing errors in transmitted data which are caused by impulse noise, other arrangements are possible. For example, in FIG. 9, a filter circuit 90 is placed in parallel across conductors 46-46 which are connected to station apparatus 92 such as a telephone set, for example. The filter circuit 90 includes a resistance 93 and a capacitance 94 in series. Typically, the resistance has a value of about 10Ω and the capacitance has a value of about 30,000 pF.

Figure 9:
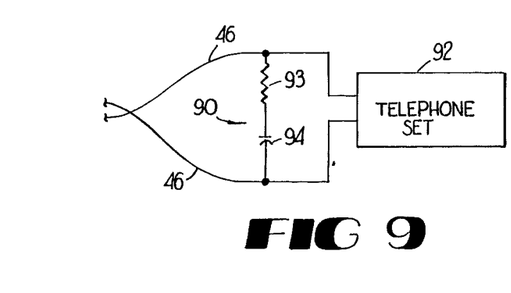
FIG. 9 is a schematic view of an alternate embodiment of a filter arrangement for use with the system of FIG. 1.

The circuit in FIG. 9 has disadvantages as well as advantages. Advantageously, the circuit in parallel does not have to carry surge currents caused by lightning, for example, and suitable capacitors usually are less expensive than the inductors required for the series circuit. However, the parallel circuit of FIG. 9 will degrade voice transmission to a greater extent that the series circuit of FIG. 1. This is so because the characteristic impedance of the cable pair is about 100 ohms at T1 frequencies and is 500 to 1000 ohms at voice frequencies (see FIG. 11). The 30,000 pF capacitor is an amount that exceeds the capacitance of a third of a mile of cable, clearly a degrader of of voice transmission. The inductor adds only one to four Ohms of reactance which clearly is negligible in a 500 to 1000 Ohm voice system.

Figure 11:
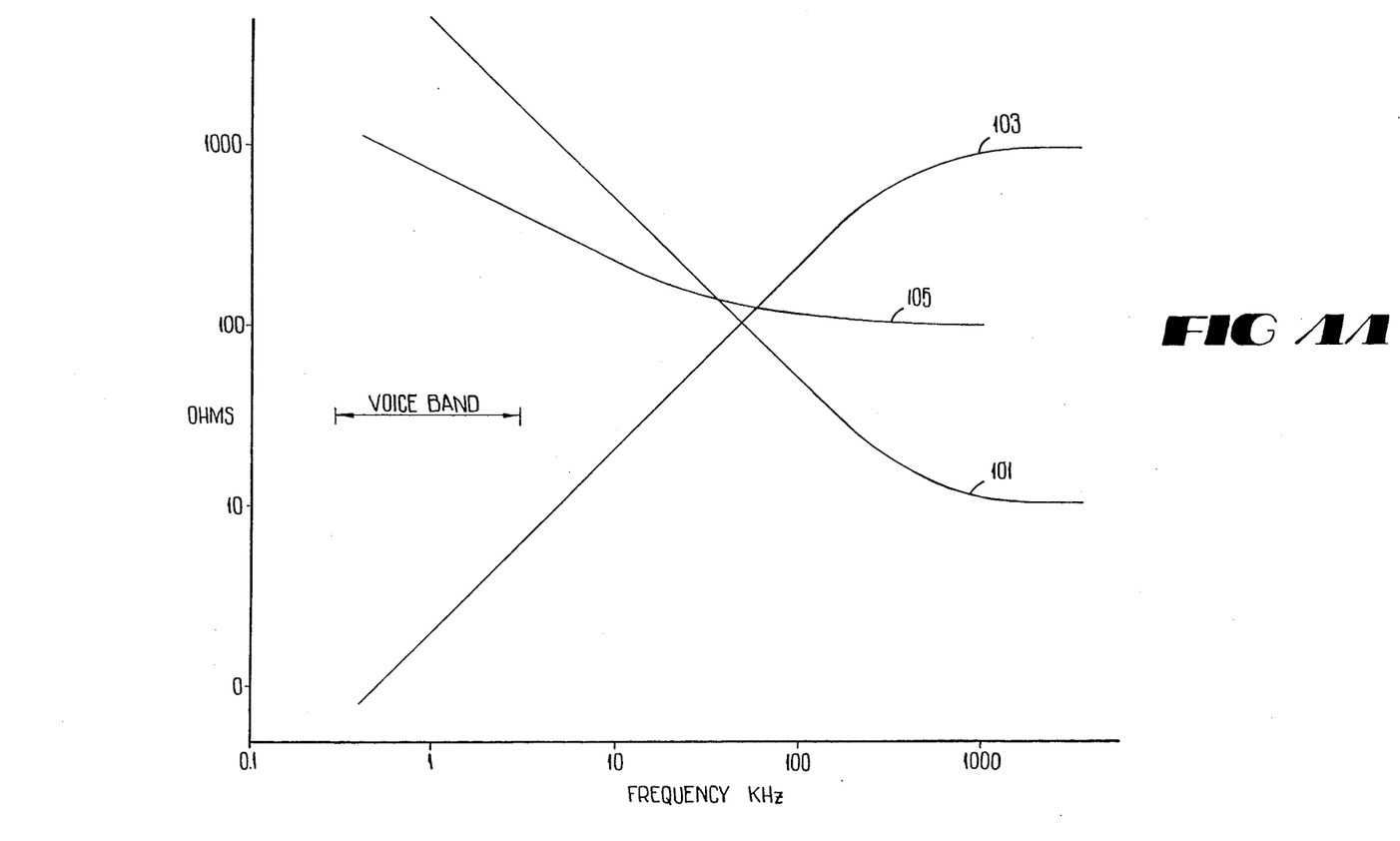
FIG. 11 is a graph which depicts filter impedances and characteristic impedance of a typical cable pair as a function of frequency.

FIG. 11 shows three graphs of impedance as a function of frequency. Curve 105 is the characteristic impedance of a typical cable pair; curve 103 is the impedance of the RL filter 80 in FIG. 1; curve 101 is the impedance of the RC filter 90 in FIG. 9. The effectiveness of a filter in eliminating signals is approximately proportional to the ratio of its filter impedance to the characteristic impedance of the cable pair. FIG. 11 shows that at frequencies above 100 kHz the two filters are equally effective. Similarly the added loss that a filter causes to a desired signal is inversely proportional to the ratio of the filter impedance to the cable characteristic impedance. FIG. 11 shows that at voice frequencies, the added loss due to the RC filter curve 101 is significant while that of the RL filter curve 103 is not. This is an approximate explanation based on only the magnitudes of impedances. When resistive and reactive components are considered, the inductance of the RL circuit actually reduces the loss at voice frequencies.

Figure 10:
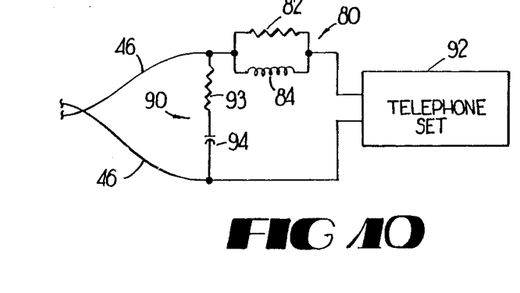
FIG. 10 is a schematic view of still another embodiment of a filter arrangement for use in a disturbing circuit of a T1 transmission system.

Still another filter arrangement is shown in FIG. 10. There, the filter circuit 80 comprising the resistance 82 and the inductance 84 in parallel is placed in series with the telephone set 92. Additionally, the circuit 90 comprising the resistance 93 and the capacitance 94 in series is placed across the conductors 46-46 in parallel with the telephone set. This combination of filter circuits provides a more abrupt filter characteristic and the curve shown in FIG. 7 would drop off more sharply after $f_c$. As a result, the attenuation of high frequency components of a disturbing signal is enhanced.

The methods and system of this invention solve the problem that impulse noise generated by interrupting the 20 Hz ringing signal on a voice pair can impair data transmission on a data pair in the same cable sheath. This impulse noise is alleged to be one of the most stringent range-limiting factors in the transmission of data. A simple filter network in series with the telephone set reduces the error rate significantly without causing any additional loss in the voiceband. Conversation should not be impaired with the filter in the circuit. Based on experimental observations, the optimum filter for the conventional residential telephone set appears to be a circuit comprising a 1 kΩ resistor in parallel with a 330 $\mu$H inductor. This filter combination is a preferred embodiment of a reasonable and inexpensive means for reducing the transmission errors caused by impulse noise from the station set.

Unlike some prior art arrangements, the filtering arrangement of this invention is not switched out during dialing. The invention allows the complete use of the telephone set without requiring any switching. The telephone set in the inventive arrangement operates independently of the data set. Further the filter arrangement is effective during all the normal telephone functions such as dialing, ringing, talking and alerting.

The claimed invention relies on a combined crosstalk path isolation in cooperation with the filter effect to reduce the magnitude of the signal which migrates from the voice pair, that is the disturbing pair, to the data pair, the disturbed pair. Crosstalk path isolation is provided by the insulation which encloses each conductor of the twisted pairs and the twist scheme.

It is to be understood that the above-described arrangements are simply illustrative of the invention. Other arrangements may be devised by those skilled in the art which will embody the principles of the invention and fall within the spirit and the scope thereof.

What is claimed is:

1. A method of providing transmitted data signals which are substantially error-free and voice signals in a single cable, said method including the steps of:

transmitting data signals on a first pair of insulated metallic conductors which is designated a disturbed pair and on which end to end transmission loss is substantial; while transmitting only voice, ringing and pulse dialing signals on a second pair of insulated metallic conductors which are closely coupled through cable crosstalk to the first pair of insulated metallic conductors on which the data signals are transmitted, said second pair being designated a disturbing pair; and reducing substantially that frequency content of a disturbing signal in the second pair of insulated metallic conductors which is in the range of the data signal spectrum prior to the disturbing signal appearing within a sheath system which is common to the first pair of conductors on which data signals are transmitted and to the pair of conductors on which voice signals are transmitted to reduce the magnitude of crosstalk between the voice and the data pairs which otherwise may cause an error in the transmitted data signals, said step of reducing being effective during normal functions which cause station generated impulse noise and which are associated with the disturbing pair.

2. The method of claim 1, wherein the reduction of the frequency content of the disturbing signal is caused to occur in the disturbing pair of conductors and adjacent to a source of the disturbing signal which appears on the pair of conductors on which voice signals are transmitted.

3. The method of claim 2, wherein the reduction of the frequency content is caused by a step of filtering out high frequency components in the disturbing signals.

4. The method of claim 2, wherein the disturbing pair is connected to station apparatus and the signaling voltage is a ringing voltage.

5. The method of claim 2, wherein the step of reducing the frequency content of the disturbing signal is carried out with substantially no degradation of voice transmission.

6. The method of claim 2, wherein the step of reducing is carried out to reduce substantially that frequency content of the disturbing signal which exceeds a value of about 100 kHz.

7. A system for transmitting voice signals and substantially error-free data signals, said system including:
a disturbing circuit which includes at least one pair of insulated metallic conductors that are used only for transmitting voice, ringing and pulse dialing signals, and means for transmitting and receiving the voice signals;
a disturbed circuit which includes at least one other pair of insulated metallic conductors which are used for transmitting relatively high speed data signals and means for transmitting and receiving the data signals, the frequency content of the data signals being substantially above the voice transmission band; and
a common sheath system for enclosing at least portions of said at least one pair of conductors which are used for transmitting voice signals and at least portions of said at least one other pair of conductors which are used for transmitting data signals; and discrete means disposed in said disturbing circuit external to said common sheath system for reducing substantially that frequency content of any disturbing signal which appears on the disturbing circuit and which is in the range of the data signal spectrum to reduce the magnitude of any crosstalk between the at least one pair of conductors and the at least one other pair of conductors during normal functions which cause station generated impulse noise and which are associated with the disturbing pair.

8. The system of claim 7, wherein said means for reducing is effective to reduce substantially the frequency content of the disturbing signal which exceeds a value of about 100 kHz.

9. The system of claim 8, wherein said means for reducing is disposed adjacent to a source of the disturbing signal which appears on the disturbing circuit.

10. A system for transmitting voice signals and substantially error-free data signals, said system including:
a cable which includes:
a plurality of pairs of insulated metallic conductors for transmitting voice signals;
a plurality of pairs of insulated metallic conductors for transmitting data signals which are separate pairs from those which transmit voice signals; and
a common sheath system for enclosing said conductors which transmit the voice signals and the separate pairs of conductors which transmit the data signals;
means for transmitting and for receiving data signals, said means for transmitting and receiving the data signals being connected by pairs of insulated metallic conductors;
means for generating a ringing voltage;
station means for receiving and for transmitting voice signals, said station means being connected by pairs of insulated metallic conductors in a voice circuit to said means for generating a ringing voltage; and
filter means disposed in said voice circuit adjacent to said means for receiving the data signals for reducing substantially that frequency content of any disturbing signal which appears on a pair of conductors for transmitting voice signals and which is in the range of the data signal spectrum to reduce the magnitude of any crosstalk between the conductor pairs which transmit voice signals and the conductor pairs which transmit data signals.

11. The system of claim 10, wherein said filter means is effective to reduce substantially the frequency content of the disturbing signal which exceeds a value of about 100 kHz.

12. The system of claim 10, wherein said filter means includes a circuit comprising a resistance and an inductance in parallel with said resistance and wherein said circuit is disposed in series with said station means for receiving said voice signals.

13. The system of claim 12, wherein said resistance has a value in the range of about 1 to 2 k$\Omega$ and said inductance has a value in the range of about 200 to 600 $\mu$H.

14. The system of claim 10, wherein the number of errors per ring interruption is substantially zero.

* * * * *